United States Patent Office
3,470,197
Patented Sept. 30, 1969

3,470,197
1-SUBSTITUTED DERIVATIVES OF 3-ETHYL-4-[1-METHYLIMIDAZOLYL-(5)-METHYL]-2-PYRROLIDINONE
John William Van Dyke, Jr., Elkhart, Ind., assignor to Miles Laboratories, Inc., Elkhart, Ind., a corporation of Indiana
No Drawing. Filed Aug. 30, 1967, Ser. No. 664,272
Int. Cl. C07d 49/36
U.S. Cl. 260—309                  4 Claims

ABSTRACT OF THE DISCLOSURE

A series of 1-substituted derivatives of 3-ethyl-4-[1-methylimidazolyl-(5)-methyl]-2-pyrrolidinone useful as antiglaucoma agents, prepared by reacting pilocarpine or isopilocarpine with ammonia or a suitable amine.

This invention relates to a novel series of compounds having beneficial pharmacological properties. More particularly, the invention relates to substituted derivatives of 3-ethyl-4-[1-methylimidazolyl-(5)-methyl] - 2 - pyrrolidinone and a process for the preparation thereof.

The novel compounds of this series may be represented by the structural formula

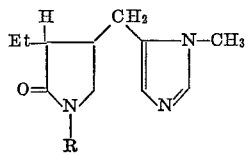

In this formula R is a member selected from the group consisting of hydrogen, alkyl, aryl and aralkyl. The alkyl group is preferably a lower alkyl having between about 1 and 3 carbon atoms although not limited to this number of carbon atoms.

These substituted derivatives of 3 - ethyl - 4 - [1-methylimidazolyl - (5) - methyl] - 2 - pyrrolidinone are facilely prepared by reacting pilocarpine or isopilocarpine with ammonia or a suitable amine. This reaction may be represented by the chemical equation

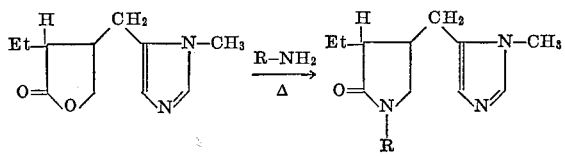

Pilocarpine or isopilocarpine is reacted with ammonia or the amine in a suitable solvent, such as methanol, ethanol and 2-propanol, which is preferably inert under the reaction conditions. Although reaction conditions are not considered critical, the reaction is beneficially carried out at elevated temperatures which are limited by decomposition of reactants and other untoward side effects. Temperatures, for example, between about 190° and 230° C. result in a satisfactory reaction rate. The reaction is a single step reaction and is conveniently performed in an autoclave.

The compounds may be formed as free bases which are only slightly soluble in an aqueous solution or as water soluble acid addition salts. Advantageously, a pharmacologically acceptable acid addition salt is formed with mineral acids such as hydrochloric acid, hydrobromic acid or sulfuric acid, or organic acids such as citric acid, oxalic acid, maleic acid or cyclohexylsulfamic acid and other similar acids. Preparation of these acid addition salts is described in the following detailed examples and will not, therefore, be set forth at this point.

The new compounds of this invention demonstrate beneficial pharmacological properties. In particular these compounds have shown activity as antiglaucoma agents in that they are effective in reducing intraocular pressure.

Medications may be prepared by combining, as an active ingredient, at least one of the novel compounds of this invention in unit dosage form with an acceptable pharmaceutical formulation. Such a formulation, having a viscosity of about 40 centipoise, may include a viscous vehicle such as 0.5% methylcellulose in a 0.9% saline solution or 1.4% polyvinylalcohol in a 0.9% saline solution. An acceptable pH that is compatible with the eye is preferred, such as one obtained by buffering the solution to a pH between about 6.5 and 7.2. In accordance with accepted pharmaceutical compounding procedures, appropriate preservatives and stabilizers may be added to form a beneficial medication. Other suitable medications may be formed according to known pharmaceutical practices.

A lowering of intraocular pressure usually associated with antiglaucoma activity was observed for these compounds in a group of rabbits in which elevated intraocular pressure was obtained by evacuating the aqueous humor from the anterior chamber of the eyes of each rabbit and refilling the chamber with a 0.9% saline solution including 0.5% methylcellulose. The lowering of elevated intraocular pressure was observed in these animals after administration of medications prepared as described above including between about 1% and 8% active ingredient. This lowering of intraocular pressure was observed with a single 0.05 ml. dose administered subconjuctivally and also with a 0.05 ml. dose administered topically in the cul-de-sac of the lower lid every thirty minutes for a total of five doses during a two hour period.

The invention will be further understood by reference to the following examples which describe specific compounds of the invention and processes for preparation thereof. These examples are intended to be representative of the invention and not to limit the scope of the same which is properly set forth in the appended claims. All temperatures are in centigrade degrees.

Example I.—1-methyl-3-ethyl-4-[1-methylimidazoyl-(5)-methyl]-2-pyrrolidinone oxalate Pilocarpine hydrochloride (5 g.) and 2.5 g. of methylamine in 10 ml. of methanol was heated at 200° in an autoclave for 3 hours. The contents of the autoclave were filtered and the autoclave rinsed with methanol and CHCl$_3$. The solvent was removed under reduced pressure and the residue extracted with CHCl$_3$—H$_2$O. The CHCl$_3$ layer was separated, dried and the solvent removed under reduced pressure. A yellow-brown oil (3.7 g.) was obtained. The free base was dissolved in methanol and oxalic acid added. The solution was treated with charcoal, filtered and 2-propanol added. The solution was concentrated and ether added. The white oxalate was recrystallized twice from 2-propanol to give 2.5 g. (M.P. 149–150°) of pure oxalate.

Analysis.—Calcd. for C$_{14}$H$_{21}$N$_3$O$_5$: N, 13.50; C, 54.01; H, 6.80. Found: N, 13.17; C, 54.04; H, 6.57.

Example II.—1-phenethyl-3-ethyl-4-[1-methylimidazolyl-(5)-methyl]-2-pyrrolidinone oxalate Pilocarpine hydrochloride (10 g.) and 19.8 g. of phenethylamine in 20 ml. of methanol were heated at 200° in an autoclave for 3 hours. The contents of the autoclave were filtered and the autoclave rinsed with methanol and CHCl$_3$. The solvent was removed under reduced pressure and the residue dissolved in CHCl$_3$—H$_2$O. The CHCl$_3$ layer was separated, dried over MgSO$_4$ and the solvent removed under reduced pressure. To remove any excess phenethylamine the residue was heated under reduced pressure (80°/1.5 mm.). The residue (13.5 g.) was treated with oxalic acid and 12 g. of salt (M.P. 160–161°) was obtained. A second crop (.7 g., M.P. 159–160°) was also obtained. The combined oxalate was recrystallized from 2-propanol and 10 g. of white needles (M.P. 176–177°) was obtained.

*Analysis.*—Calcd. for $C_{21}H_{27}N_3O_5$: N (total), 10.47; N (basic), 3.49; C, 62.84; H, 6.78. Found: N (total), 10.35; N (basic), 3.46; C, 62.29; H, 7.12.

Example III.—3-ethyl-4-[1-methylimadazolyl-(5)-methyl]-2-pyrolidinone cyclohexylsulfamate Pilocarpine hydrochloride (10.1 g.) was added to 50 ml. of methanol saturated with ammonia gas (12 g.) and placed in an autoclave. The mixture was heated at 200° for 5 hours. The contents of the autoclave were filtered and the autoclave rinsed with methanol. The methanol was removed on a steam bath under reduced pressure. The residue was shaken in $CHCl_3$ and $H_2O$ and filtered. The $CHCl_3$ extract was separated, dried and the solvent removed. A viscous residue (6.5 g.) was obtained. The residue was dissolved in acetone and an equal weight of cyclohexylsulfamic acid was added. A gummy solid developed that was induced to solidify. The material was recrystallized from acetone (M.P. 122–4°).

*Analysis.*—Calcd. for $C_{17}H_{30}N_4SO_4$: C, 52.82; H, 7.83; N (basic), 3.62; O, 16.55. Found: C, 52.47; H, 7.95; N (basic), 3.71; O, 16.15.

What is claimed is:
1. A compound selected from the group consisting of compounds of the formula

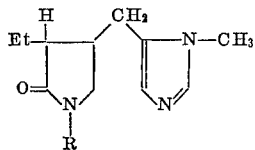

in which R is a member selected from the group consisting of hydrogen, lower alkyl, and phenylloweralky and pharmacologically acceptable salts thereof.

2. A compound according to claim 1 which is 1-methyl-3 - ethyl - 4 - [1-methylimidazolyl-(5)-methyl]-2-pyrrolidinone.

3. A compound according to claim 1 which is 1-phenethyl - 3 - ethyl - 4 - [1 - methylimidazolyl - (5) - methyl-2-pyrrolidinone.

4. A compound according to claim 1 which is 3-ethyl-4-[1-methylimidazolyl-(5)-methyl]-2-pyrrolidinone.

References Cited

UNITED STATES PATENTS

| | | | |
|---|---|---|---|
| 2,744,899 | 5/1956 | Huebner | 260—309 |
| 2,877,179 | 3/1959 | Hughes | 260—309.6 |
| 3,126,395 | 3/1964 | Kitahonoki et al. | 260—326.5 |
| 3,136,780 | 6/1964 | Kolyer et al. | 260—326.5 |
| 3,138,610 | 6/1964 | Buc et al. | 260—309.6 |
| 3,161,631 | 12/1964 | Straley et al. | 260—326.5 |
| 3,194,813 | 7/1965 | Le Suer et al. | 260—326.5 |

OTHER REFERENCES

Lunsford et al.: Chem. Abst., vol. 60, Column 15813 (1964).

HENRY R. JILES, Primary Examiner

NATALIE TROUSOF, Assistant Examiner

U.S. Cl. X.R.

260—999

PO-1050
(5/69)

UNITED STATES PATENT OFFICE
CERTIFICATE OF CORRECTION

Patent No. 3,470,197      Dated September 30, 1969

Inventor(s) John William Van Dyke, Jr.

It is certified that error appears in the above-identified patent and that said Letters Patent are hereby corrected as shown below:

Column 2, Line 41, In the chemical name, "methylimidazoyl" should read -- methylimidazolyl --.

Column 3, Line 9, In the chemical name, "methylimadazolyl" should read -- methylimidazolyl --.

Column 3, Line 10, In the chemical name, "pyrolidinone" should read -- pyrrolidinone --.

Column 4, Line 8, Insert immediately following "methyl" -- ] --.

SIGNED AND SEALED

MAY 26 1970

(SEAL)
Attest:

Edward M. Fletcher, Jr.
Attesting Officer

WILLIAM E. SCHUYLER, JR.
Commissioner of Patents